(12) United States Patent
Kim et al.

(10) Patent No.: US 7,863,826 B2
(45) Date of Patent: Jan. 4, 2011

(54) ILLUMINATION CONTROL APPARATUS USING A PULSATING WAVES

(76) Inventors: Si Jong Kim, Hakik2-Dong Nam-Ku, Singdonga Aptment 41-507, Incheon (KR) 402-042; Sung Hyun Baik, Sinjung 3-Dong 1194-3, Yangcheon-Ku, Seoul (KR) 158-073; Jae Won Hwang, Dawon Apt 202-801, Neson-Dong, Uhwhang-Si Keongki-Do (KR) 437-080

( * ) Notice: Subject to any disclaimer, the term of this patent is extended or adjusted under 35 U.S.C. 154(b) by 357 days.

(21) Appl. No.: 12/160,588

(22) PCT Filed: May 9, 2006

(86) PCT No.: PCT/KR2006/001733

§ 371 (c)(1),
(2), (4) Date: Jul. 10, 2008

(87) PCT Pub. No.: WO2007/091750

PCT Pub. Date: Aug. 16, 2007

(65) Prior Publication Data

US 2008/0303453 A1    Dec. 11, 2008

(30) Foreign Application Priority Data

Feb. 6, 2006    (KR) .................... 10-2006-0011263

(51) Int. Cl.
*H05B 37/02*    (2006.01)

(52) U.S. Cl. .................. 315/224; 315/247; 315/209 R; 315/291; 315/312

(58) Field of Classification Search ................ 315/224, 315/225, 247, 246, 209 R, 291, 301, 312–326
See application file for complete search history.

(56) References Cited

U.S. PATENT DOCUMENTS

2006/0267513 A1*  11/2006  Morishita ................. 315/247
2009/0079354 A1*   3/2009  Deurloo et al. .......... 315/209 R

FOREIGN PATENT DOCUMENTS

| JP | 06-113556 | 4/1994 |
| JP | 2002-164193 | 6/2002 |
| KR | 20-0407445 | 1/2006 |

* cited by examiner

*Primary Examiner*—Tuyet Thi Vo
(74) *Attorney, Agent, or Firm*—Park & Associates IP Law LLC (57) ABSTRACT

An illumination control apparatus using a pulsating wave is disclosed, in which a pulsating power is supplied to an electric power supplied to a fluorescent light stabilizer which needs an AC voltage. The level of the same is varied and supplied to an illumination control, such as fluorescent light and common light, is possible based on an input power control of a stabilizer without changing an installation of a conventional fluorescent light and common light device and of the power construction. In addition, the electric power can be concurrently supplied to a plurality of stabilizers based on a capacity of apparatus without changing the construction of a conventional system.

3 Claims, 8 Drawing Sheets

ILLUMINATION CONTROL APPARATUS USING A PULSATING WAVES

TECHNICAL FIELD

The present invention relates to an illumination control apparatus using a pulsating wave, and in particular to an illumination control apparatus using a pulsating wave in which a spot flash and illumination control are possible for a lamp connected on a single cable without a special stabilizer.

BACKGROUND ART

Over power consumption is performed due to a high illumination using a T5 fluorescent light (deco lamp/slim light) and high electric power bulb in consideration with an imitation of a store such as a commercial store including home. In particular, in the case of an open store built on the ground, it is needed to keep a high illumination state for 24 hours using a luminance discharge light with low power consumption, so that over power is consumed. In addition, an adaptor for a power converter and a high capacity of current DC motor and an inverter having a simple power converter function are used for convenience. So, power consumption increases, and the system is complicated, and more cost is needed.

A method for controlling the level of illumination is classified into a method for adjusting voltage and a method for adjusting a frequency. In the former method, since it is not related with the present invention, the description of the same is omitted. The latter method may be classified into a method for adjusting voltage using a transformer, a method for adjusting voltage using an intermittent pulse and a method for controlling voltage based on a phase control.

The method for using a transformer will be first described. A plurality of taps are installed at a secondary side of a transformer for thereby supplying voltage to a portion which needs lighting. The above method is not easy to continuously adjust brightness, and efficiency decreases. So, this method is not currently used.

The method, which uses an intermittent pulse, is directed at controlling a pulse of a conventional inverter. Since the conversion efficiency of the inverter corresponds to the whole efficiency, an advanced inverter technology is needed. The construction is complicated, so that it may be very expensive.

The method based on a phase control is directed to supplying a current at a certain level of AC voltage using the same device as Triac for thereby adjusting the whole voltage. The control of the power by a phase control is a well known art in the industry. In the case of a phase control, it has a simple construction and a good power conversion efficiency, so that it is widely used for an illumination control.

For example, according to the Korean patent application No. 1984-0005770 (illumination control switch for wall box having a plurality of remote control switches), a lighting apparatus being able to control illumination based on an application of the above technology is disclosed. According to the Korean utility model registration No. 20-0244853, a lighting apparatus being able to control illumination based on another application of the above technology is disclosed. According to the above technologies, a setting unit is provided for setting nominal voltage with respect to a lighting assembly, and a control unit is provided for a phase control at each semi-cycle of an electric power applied. There are further provided a zero point detector for a control unit, and a microprocessor for determining a turn on time of Triac using the same, and a lamp unit. With the above construction, a zero point is detected from a power voltage inputted, and a phase control is performed by a processor, so that illumination is controlled by determining electric power applied to light.

However, the method by a phase control and a reverse phase control method have the following problems.

Figure 13:
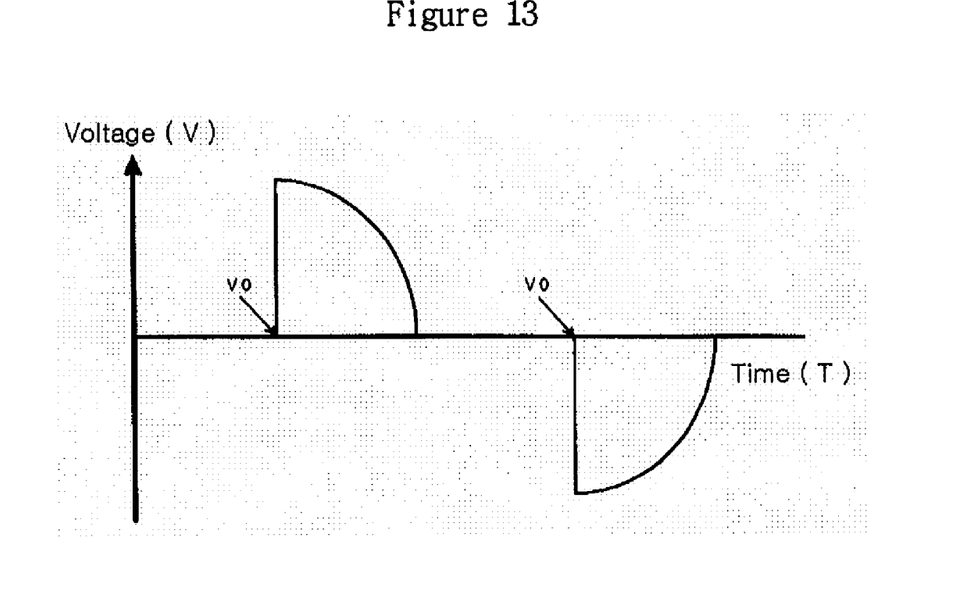
FIGS. 13 and 14 are supply waveforms based on a conventional phase control and a reverse phase control.

As shown in FIG. 13, when electric power is supplied based on the phase control method, a very high voltage is initially supplied at a start point of the power supply. Since the voltage supply is performed with a high voltage, voltage impact may occur in the load. In a worse case scenario, the load may be damaged by the voltage impact, and/or harmonic frequency may occur. So as to overcome the above problems, a certain filter is used for thereby decreasing voltage impact and harmonic frequency.

Figure 14:
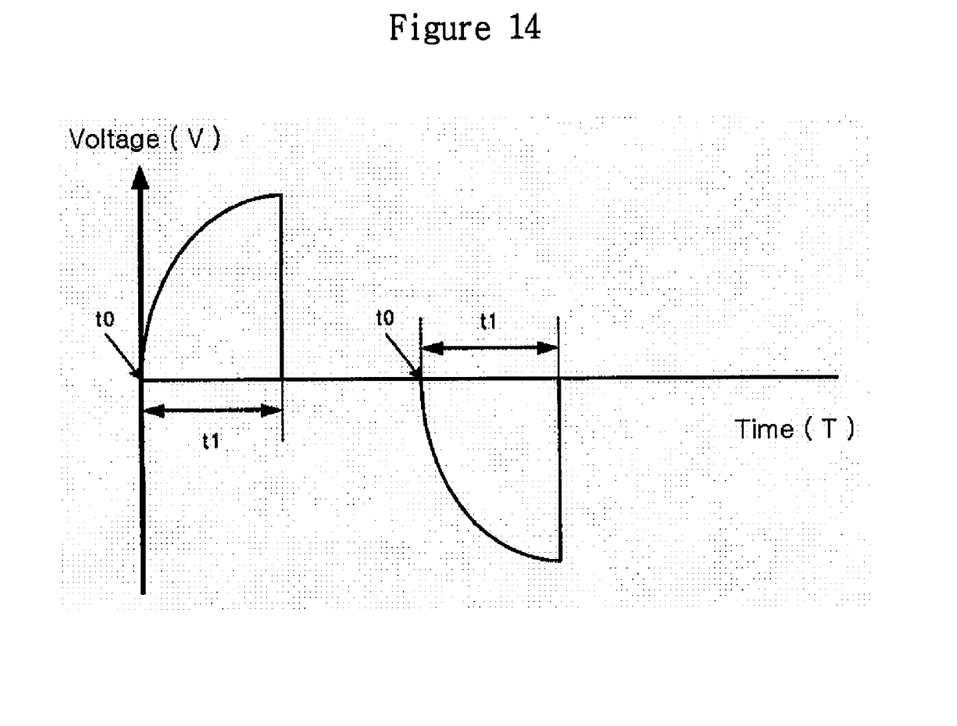

However, the above methods have problems as well. Big noises occur at a coil, which is used for decreasing voltage impact. Such noises may be big problems depending on the kinds of loads. In case that the load is lighting and the lighting is used indoor, the problems are very serious. As shown in FIG. 14, the reverse phase control method may supply non-uniform electric power owing to counter electro-motive force with respect to a blank time period of electric power since a turn off/on time of the control point during the control operation. In lower stages, the control problem increases. Critical errors may occur in the stabilizer of load because of high frequency at a basic control point.

In addition, according to the illumination control method, a triac, SCR, and FET devices are used as power control devices. As an AC voltage/current control method, one cable of the input AC power is connected with one end of the power device, so that the gate terminal of the power control device is turned on and off with a DC signal level, and the AC voltage or current is converted. The above methods do not make any problems with respect to incandescent lamps, such as filament preheating type. However, when the AC voltage is introduced at the lower stages during the dimming control of the above method, a flickering and trembling phenomenon occurs, due to the discharge in the case of fluorescent light, so that the life span of tube may decrease.

Figure 1:
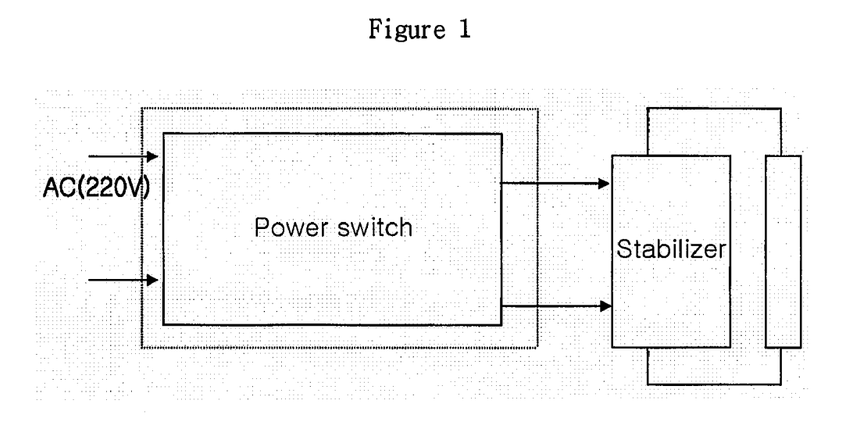
FIG. 1 is a view illustrating a conventional fluorescent light installation.
Figure 2:
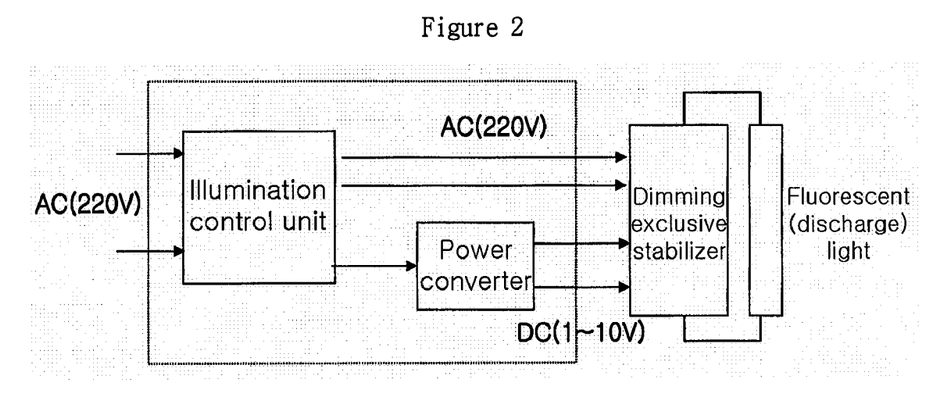
FIG. 2 is a view illustrating an installation of a conventional dimming exclusive stabilizer.

So as to overcome the above problems, many studies have been conducted on the peripheral filter circuits during the control of power control devices. In the case of low electric power, since there is a certain limit in the tube voltage current in the above discharge light, the control of the fluorescent light of low power is performed by the illumination controller of the fluorescent light which adapts a dimming exclusive special stabilizer. As shown in FIG. 2, in the conventional dimming apparatus, a power supply unit panel is needed. Since a DC converter is necessarily attached to the stabilizer for a dimming operation, as shown in FIG. 1, there may be many problems in construction, when it is adapted to a facility of conventional fluorescent light. When it is newly adapted, an expensive system control apparatus is needed for thereby increasing the expenditure. Since the change of the electric level is less based on the change of the illumination during the installation, only indirect lighting effect can be obtained irrespective of the effect of cost down of electric power, so that it is impossible to obtain an electric power saving effect. Since a facility construction is additionally needed when the local unit illumination control is needed, the construction of the conventional electric power facility should be changed.

DISCLOSURE OF THE INVENTION

Accordingly, it is an object of the present invention to provide an illumination control apparatus using a pulsating wave in which a pulsating power is supplied to the electric power supplied to a fluorescent light stabilizer that needs an AC voltage, the level of the same is varied and supplied, an illumination control, such as fluorescent light and common light, is possible based on an input power control of a stabilizer without changing an installation of a conventional fluorescent light and common light device and the power construction. In addition, the electric power can be concurrently supplied to a plurality of stabilizers based on a capacity of apparatus without changing the construction of a conventional system.

BRIEF DESCRIPTION OF THE DRAWINGS

The present invention will become better understood with reference to the accompanying drawings which are given only by way of illustration and thus are not limitative of the present invention, wherein.

MODES FOR CARRYING OUT THE INVENTION

Figure 4:
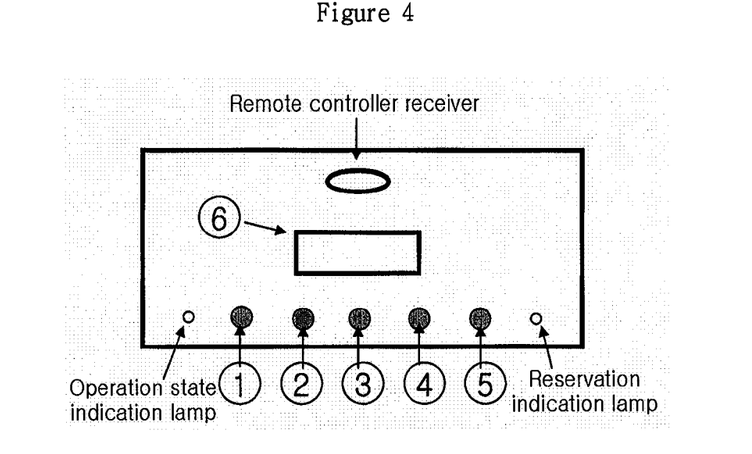
FIG. 4 is a view illustrating a construction of a main switch of an illumination control apparatus according to the present invention.

FIG. 4 is a view illustrating an outer construction of a main switch during an actual installation of an illumination control apparatus according to the present invention. Provided are an; on and off switch for illumination control, an up and down level switch, a temporal level setting switch, a reservation off switch, an illumination level and illumination reservation display, a remote controller receiver and an operation state indication light.

Here, the on and off switch performs an on and off function of power as a main switch, and the up and down level switch allows a user to control the intensity of the illumination, and the temporal level setting switch selects a certain illumination level in a switch on switch, so that the selected illumination level can begin when the system is turned on after a switch off.

The reservation off switch is provided for reserving the time of power off.

The illumination level and illumination display is a window for visually displaying a state of the current illumination level, so that it is easy for the user to set and select the illumination level and the on and off time of the apparatus. For example, the illumination level and on and off time can be shown digitally.

The remote receiver allows the remote controller to perform the switch function, and allows a plurality of the apparatuses of the present invention to be used as remote controller using the ID of the system. The circuit of the signals of the receiver of the remote controller can be controlled by the CPU, so that it is simplified. When the present invention is operated in multiple places and with a plurality of control groups in a building, it can be controlled at one place (for example, communication room, management room) using the communication port of each system.

Figure 3:
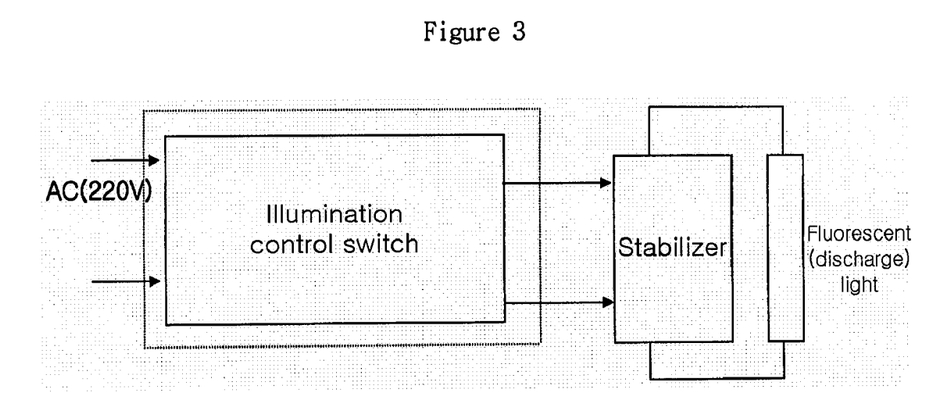
FIG. 3 is a view illustrating an installation of an illumination control apparatus according to the present invention.

FIG. 3 is a view of an operation that illumination can be controller without additional facilities to a conventional apparatus and any changes in a system by adapting the illumination control apparatus to a conventional illumination apparatus.

Figure 5:
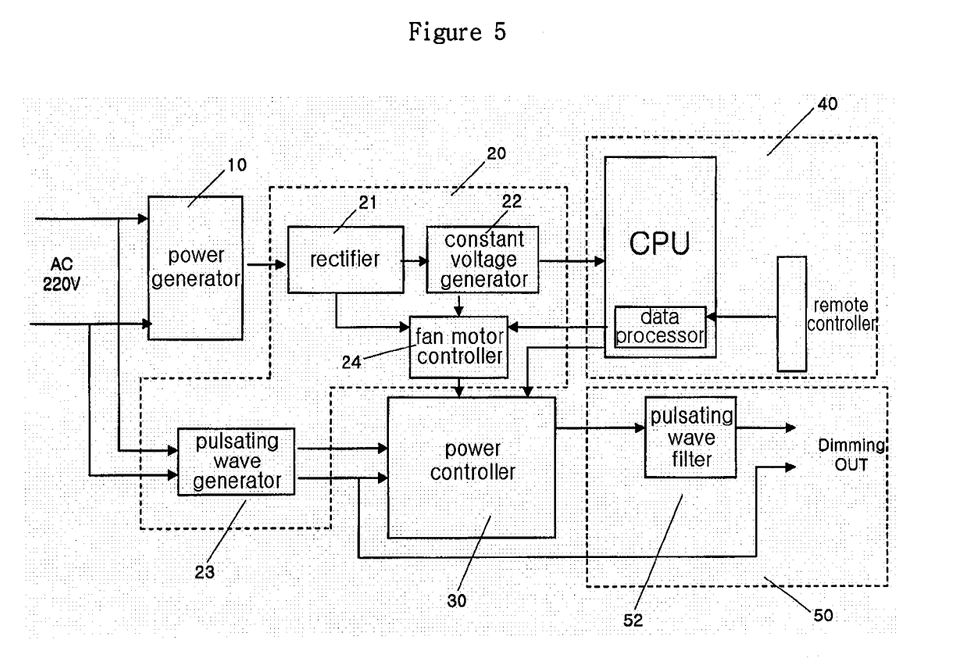
FIG. 5 is a block diagram of an apparatus according to the present invention.

FIG. 5 is a block diagram of an inner construction of an illumination control apparatus according to the present invention. The apparatus according to the present invention comprises a power input unit 10, a power control signal generator 20, a power controller 30, a remote controller 40 and a power output unit 50.

Figure 6:
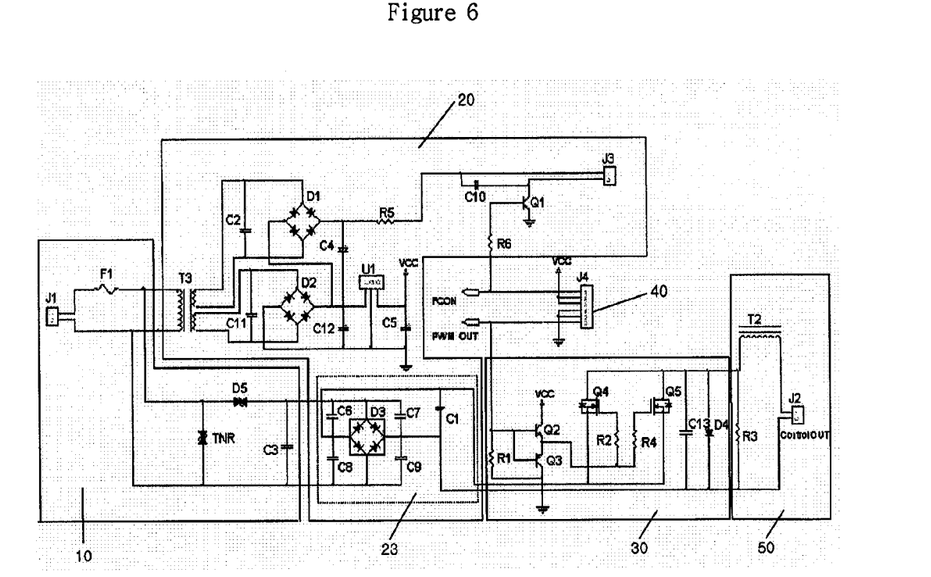
FIG. 6 is a circuit diagram of an apparatus according to the present invention.

FIG. 6 is a circuit diagram of an inner construction of an apparatus according to the present invention.

Figure 7:
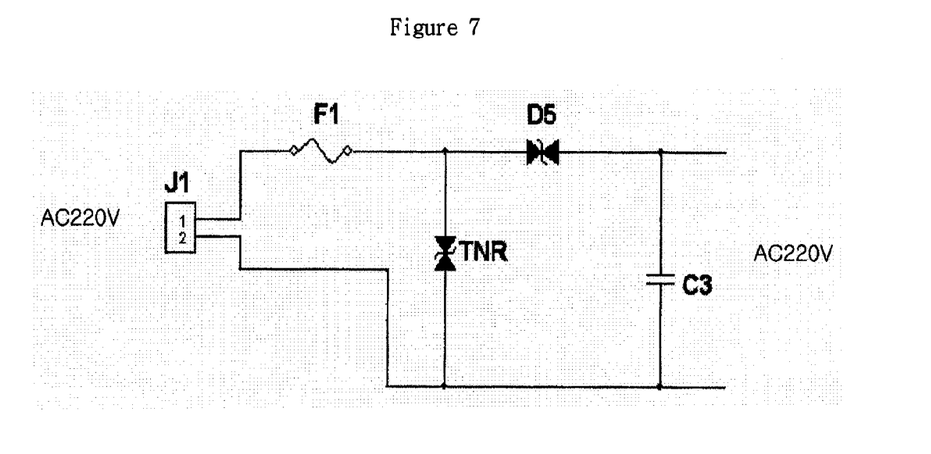
FIG. 7 is a circuit diagram of a power generator.

FIG. 7 is a detailed view of an example of the power input unit 10 that comprises a fuse, a TNR, a diode D5 and a condenser C3. With the above construction, noises are filtered, and the noise-removed AC power is supplied. Since the above construction is a known art, the description thereon will be omitted.

The power input unit filters noises and supplies constant voltage to the data processor of the CPU controller, the power control signal generator and the power controller, respectively, and supplies voltage for controlling the fan motor so that the heating of the power controller device can be controlled.

Figure 8:
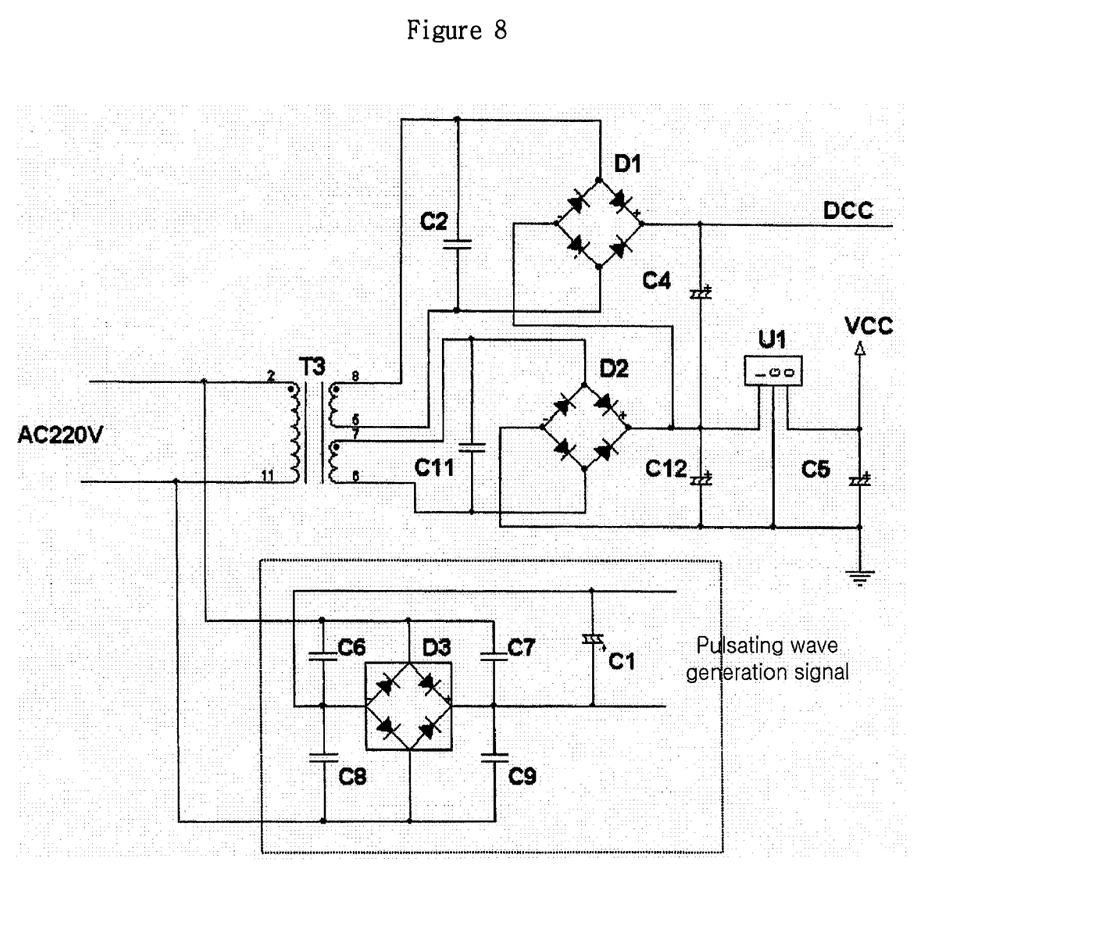
FIG. 8 is a circuit diagram of a power control voltage generator.
Figure 9:
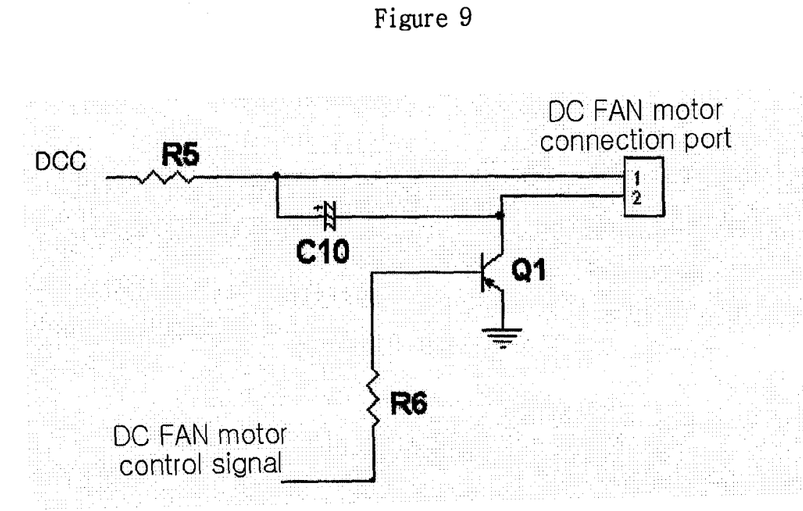
FIG. 9 is a circuit diagram of a fan motor controller.

FIG. 8 is a detailed view of the power control voltage generator 20, and the power control voltage generator 20 comprises a rectifier 21, a constant voltage generator 22, a pulsating wave generator 23, and a fan motor controller 24.

The AC 220V power inputted through the power input unit 10 is deceased to the AC level (for example 9V) proper to the apparatus through the transformer T3, and the deceased AC voltage supplies a DC constant voltage VCC needed to the power controller 30 and the voltage needed to the CPU control through the constant voltage generator 22, which comprises the device D2 of the rectifier 21 and the voltage regulator IC (UI of FIG. 8), and generates a negative voltage (ground) signal needed for the fan motor control.

The other deceased AC voltage is converted into the independent DC voltage DCC through the device D1 of one end of the rectifier and is connected with one end of R5 as shown in FIG. 6C, and the other end of R5 forms a positive signal line of the FANCON connector, and the signal FCON controlled by the microcomputer is connected at one end of the R6, and one end of the R6 is connected with the base terminal of the transistor Q1. The transistor Q1 is a transistor which operates an operation of the switching needed for the fan motor control. The emitter terminal of the transistor Q1 is connected with the negative voltage, and the collector terminal consists of a negative signal line of the FANCON connector. The condenser C10 is connected at both ends of the positive and negative signal lines of the FANCON connector for thereby operating as a bias circuit, so that the voltage is not suddenly supplied to the fan. The downed AC voltage is converted into the DC voltage level DCC, so that the voltage is supplied to the fan motor controller 24, which cools the radiating plate of the power controller 30.

The pulsating wave generator 23 of the power control voltage generator rectifies the 220V AC voltage into a high level voltage through the rectifier D3 and generates the pulsating signal through the electrolysis condenser C1. In case that the load is a low current fluorescent light, the condensers C6, C7, C8 and C9 are connected at each end of the rectifier D3 for disconnecting the high frequency which is inputted into the rectification terminal.

Figure 11:
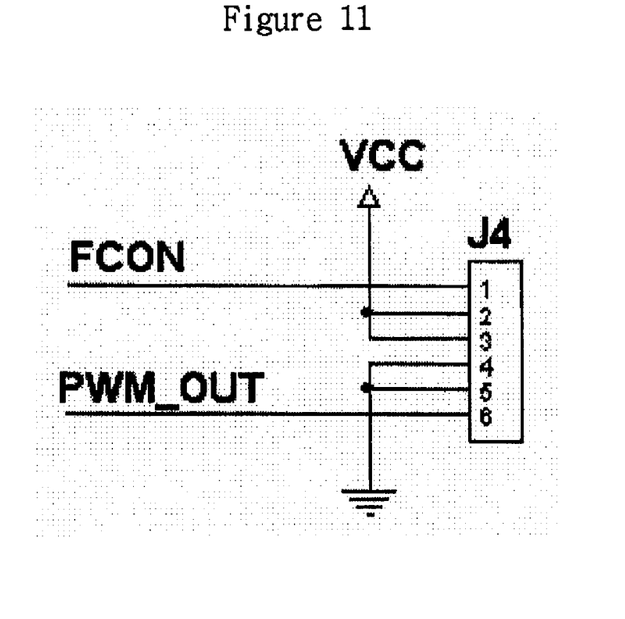
FIG. 11 is a circuit diagram of a CPU controller.

The CPU controller 40 prevents a sudden current flow during the dimming on and off operation with respect to a high level voltage load and allows soft start and soft off functions. In case of soft start, the power is needed to reach the 100% point all the time, so that it is possible to keep a start constant voltage owing to the characteristic of the power load and to implement a preheating time of the filament owing to the characteristic of the discharge light.

The CPU controller outputs a control signal through the data processor, which control signal is needed to the power controller 30 and the fan motor controller 24. A manager inputs a remote signal through the CPU controller for an illumination control through a remote controller, so that it is possible to perform a desired illumination control. FIG. 8B is a view of an operation that a data processor J4 of the CPU controller outputs a fan motor control driving signal FCON and a power controller driving signal PWM_OUT. The CPU controller comprises a communication port and a remote control signal receiver for concurrently remotely controlling the multiple apparatuses. A display and audible unit is further provided for indicating the state information.

Figure 10:
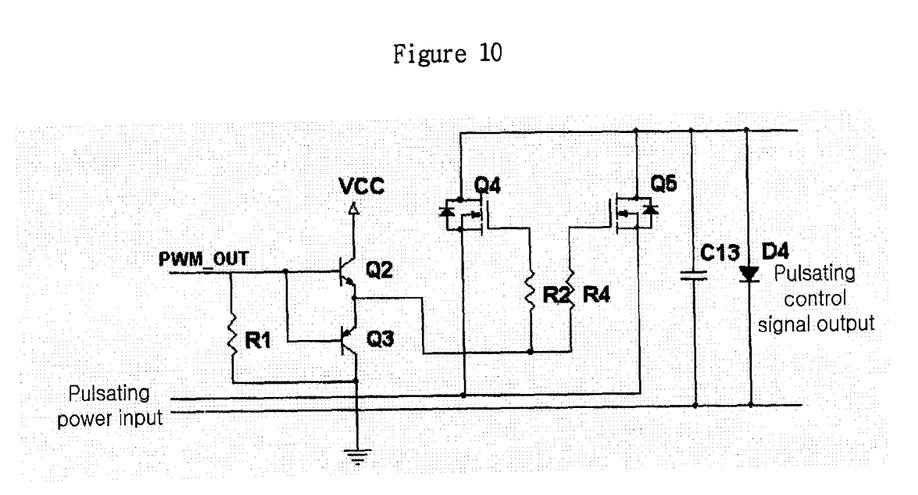
FIG. 10 is a circuit diagram of a power controller.

As shown in FIG. 10, the power controller 30 provides a constant voltage provided from the power generator 20 to power device driver driving circuits Q2 and Q3 formed of high speed switching exclusive driver device modules. The number of the driving circuits may be increased or decreased depending on the change in demand (load) capacity. In the power device driver driving circuits Q2 and Q3, positive voltage is provided to the collector terminal of the switching device Q2, and negative voltage is provided to the collector terminal of the switching device Q3. The collector terminal of the switching device Q3 is connected with 1 of the resistor R1, and 2 of the resistor R1 is connected with one end in which the base terminals of the switching device Q2 and the switching device Q3 are commonly connected for thereby forming a bias circuit. A control signal is received through the port of the CPU controller 40 at the connection terminal in which the base terminals of the switching devices Q2 and Q3 are commonly connected, so that the driver driving circuits Q2 and Q3 are turned on and off. The driver driving circuit is designed so that the output of the switching device Q2 has more current in the case of high voltage and is designed so that the output of the switching device Q3 has more current in low voltage. So, it is possible to prevent damages of the system owing to the electric potential difference of the sudden switching level of the power device.

In the power controller, since the secondary switching is performed by the high power switching devices Q4 and Q5 in accordance with a switching of the power device driver driving circuits Q2 and Q3, it is possible to obtain an accurate switching width for thereby enhancing a reliable switching. Namely, an output in which the emitter terminals of the driver driving circuits Q2 and A3 are commonly connected is provided as an input signal of the gate terminals of the switching devices Q4 and Q5, and the bias resistors R2 and R4 are used, so that it is possible to control the accuracy of the switching width. In particular, as the load capacity is increased or decreased, the number of the power devices of the switching devices Q4 and Q5 is increased or decreased, so that the bias resistance values change. As the emitter terminals of the driver driving circuits Q2 and Q3 are commonly connected, it is possible to automatically control the switching width without changes to the bias resistors R2 and R4. As the high power switching devices, the commercial FET (Field Effect Transistor) or the IGBT (Insulated Gate Bipolar Transistor) may be used as a high power switching device, so that a maintenance including an error or failure may be easy.

Figure 15:
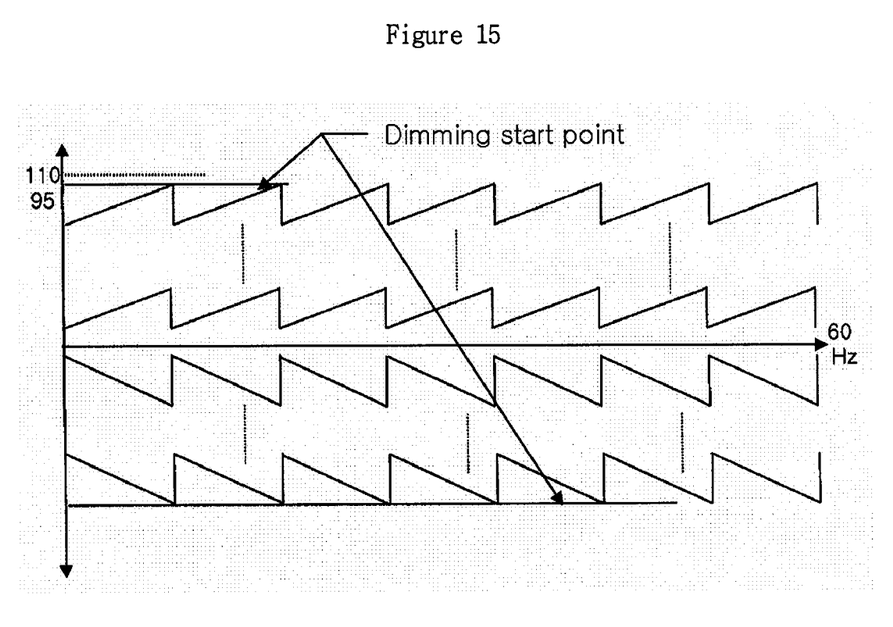
FIG. 15 is a waveform of a pulsating voltage supply according to the present invention.

FIG. 15 is a view illustrating an operation that the level of the pulsating wave is controlled in accordance with a switching control of the power controller. As shown therein, as the switching control of the power controller 30 is performed, the pulsating waves P1 and P4 of the positive/negative voltages outputted from the pulsating wave generator 23 decrease and become P2 and P3, so that it is possible to obtain the same type signals as the illumination is controlled by controlling the voltage by changing the DC level which is an output of the power converter in the conventional dimming control fluorescent light stabilizer. On the contrary, when the level of the pulsating wave is increased, the illumination is increased.

Figure 12:
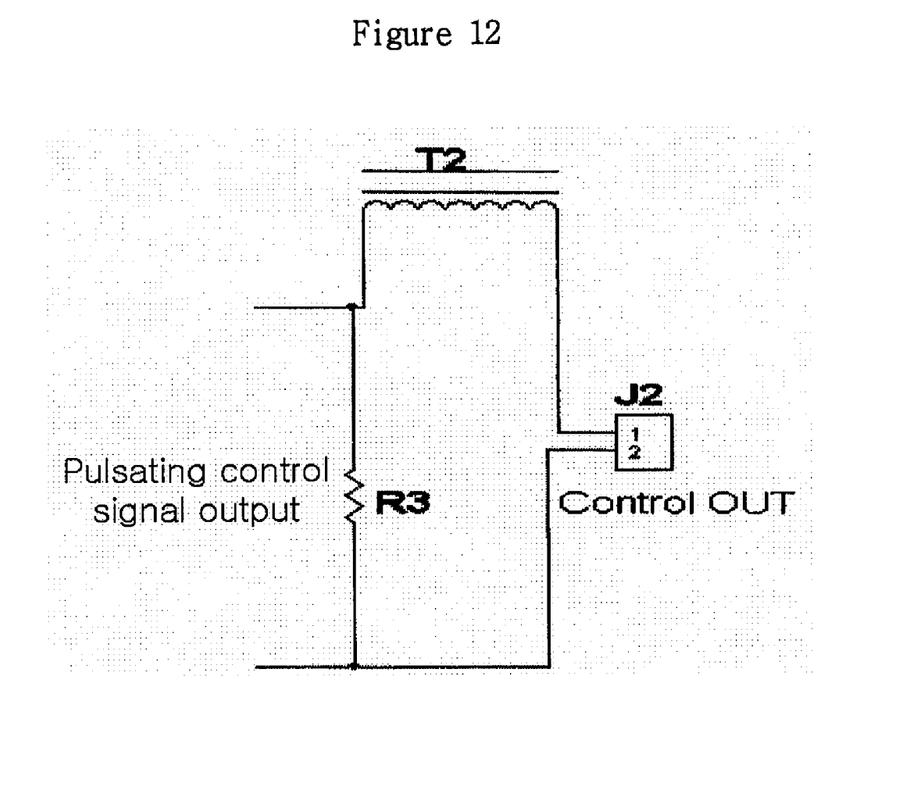
FIG. 12 is a circuit diagram of a power output unit.

As shown in FIG. 12, the power output unit 50 filters the low frequency and high frequency signals, which are generated at the control point, by the pulsating wave filter 52 with respect to the dimmed and outputted DC signal, and the filtered signals are outputted to the power of the stabilizer, which is a lighting load connected with the output terminal of the apparatus. Here, the pulsating wave filter is a DC low frequency filter and interferes with the straight characteristic of the DC voltage and current, so that inductive noises inputted into the output circuit along with the switching control frequency are removed.

The conventional filter uses a high frequency filter for removing high frequency noises by using a coil of the reactance or a ferrite (steel powder) core. In the present invention, the impedance matching of the output circuit signal is obtained by using the component of the DC resistors DC-R, not the reactance value L of the low frequency filter. Winding is performed on the Si steel plate. The DC filter is generally used at the input signal, but in the present invention, it is used at the output signal, so that a two-layer structure filter effect is obtained, whereby it is possible to remove the trembling phenomenon at the lower level during the illumination control of the fluorescent light.

As described above, the present invention relates to an illumination control apparatus having a power conversion function using a pulsating wave. A DC output signal is implemented based on an input AC voltage signal and is supplied as an input power of a fluorescent light stabilizer which is needed at a load terminal of a fluorescent light. A pulsating driving signal fitting to a C level is supplied as compared to the construction in which a fluorescent light is controlled based on a dimming control stabilizer by separately providing an illumination control unit for inputting an AC power input and a converter apparatus for generating a driving signal of a DC level. So, in the present invention, the construction of the system is simple, and an AC output voltage range of the load terminal can be stably controlled between 30V to 220V. The dimming control can be implemented through the voltage control without any problems.

In addition, the apparatus of the present invention is not affected by the harmonic waves generated when adapted to a control product and inverters which uses the converters and a power control circuit of a motor controller. It is possible to overcome load damage problem owing to a harmonic wave of a peak value in its waveform.

As the present invention may be embodied in several forms without departing from the spirit or essential characteristics thereof, it should also be understood that the above-described examples are not limited by any of the details of the foregoing description, unless otherwise specified, but rather should be construed broadly within its spirit and scope as defined in the appended claims, and therefore all changes and modifications that fall within the meets and bounds of the claims, or equivalences of such meets and bounds are therefore intended to be embraced by the appended claims.

What is claimed is:

1. An illumination control apparatus using a pulsating wave, comprising:

a power generator 10 which filters externally supplied power and supplies to a power control voltage generator;

a power control voltage generator 20 which includes a rectifier 21 for rectifying the voltage from the power generator, a constant voltage generator 22 for generating a constant voltage from the rectifier, a fan motor controller 24 for controlling a fan motor in accordance with a driving signal from the CPU controller 40 and a pulsating wave generator 23 for generating a pulsating wave;

a power controller 30 which controls a level width of a pulsating voltage from the pulsating wave generator 23 by using a switching device;

a CPU controller 40 which supplies a driving signal to the fan motor controller 24 and the power controller 30; and a power output unit 50 which filters noises of pulsating wave voltages from the power controller 30 and outputs the same.

2. The apparatus of claim 1, wherein said switching device of the power controller 30 comprises high power control devices Q4 and Q5 and driving devices Q2 and Q3, which drive the gate terminals of the devices, so that the number of the same can be adjusted in accordance with the load of the power control.

3. The apparatus of claim 1, wherein said CPU controller 40 includes a communication port and a remote control signal receiver for thereby controlling a plurality of loads.

* * * * *